US011034581B2

(12) United States Patent
Brachmann et al.

(10) Patent No.: US 11,034,581 B2
(45) Date of Patent: *Jun. 15, 2021

(54) METHOD AND DEVICE FOR THE CONTINUOUS NEUTRALIZATION OF HYDROCHLORIC ACID

(71) Applicant: Covestro Deutschland AG, Leverkusen (DE)

(72) Inventors: Andreas Brachmann, Dormagen (DE); Thomas Freitag, Dormagen (DE); Juergen Hecke, Burscheid (DE); Axel Hirschberg, Cologne (DE); Wolfgang Kern, Moers (DE); Martin Leipnitz, Markkleeberg (DE); Ralf Friedrichsen, Cologne (DE); Volker Rossmann, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/479,030

(22) PCT Filed: Jan. 18, 2018

(86) PCT No.: PCT/EP2018/051146
§ 371 (c)(1),
(2) Date: Jul. 18, 2019

(87) PCT Pub. No.: WO2018/134277
PCT Pub. Date: Jul. 26, 2018

(65) Prior Publication Data
US 2019/0330060 A1   Oct. 31, 2019

(30) Foreign Application Priority Data

Jan. 20, 2017  (EP) ..................... 17152418

(51) Int. Cl.
*C01B 7/01* (2006.01)
*C02F 1/66* (2006.01)
(Continued)

(52) U.S. Cl.
CPC ............... *C01B 7/01* (2013.01); *C01B 7/04* (2013.01); *C01B 7/0706* (2013.01);
(Continued)

(58) Field of Classification Search
CPC .......... C01B 7/01; C01B 7/04; C01B 7/0706; C01B 7/07; C01B 7/075; C01B 32/80;
(Continued)

(56) References Cited

U.S. PATENT DOCUMENTS 4,847,408 A * 7/1989 Frosch ................ C07C 263/20
560/347
5,015,457 A 5/1991 Langhoff et al.
(Continued)

FOREIGN PATENT DOCUMENTS

AT          234639 B        7/1964
WO    WO-2008083997 A1     7/2008

OTHER PUBLICATIONS

International Search Report for PCT/EP2018/051146 dated Mar. 19, 2018.
Written Opinion of the International Searching Authority for PCT/EP2018/051146 dated Mar. 19, 2018.

*Primary Examiner* — Joseph W Drodge
(74) *Attorney, Agent, or Firm* — Faegre Drinker Biddle & Reath LLP

(57) ABSTRACT

Disclosed is a method and a device for the continuous neutralization of hydrochloric acid at an industrial scale.

8 Claims, 4 Drawing Sheets

Figure 1:
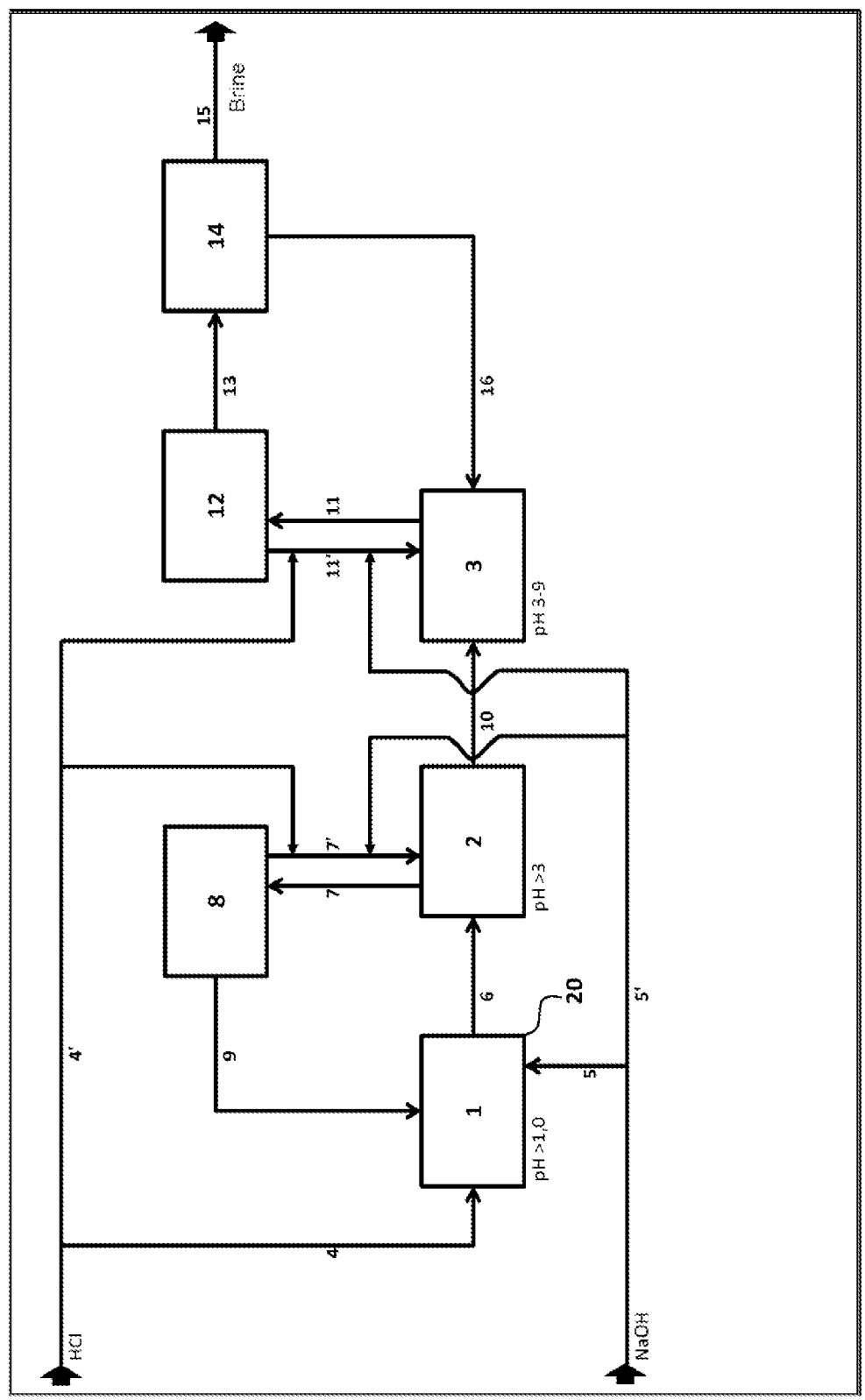

(51) Int. Cl.
*C02F 1/46* (2006.01)
*C01B 7/04* (2006.01)
*C01B 7/07* (2006.01)
*C02F 1/467* (2006.01)
*C02F 101/12* (2006.01)

(52) U.S. Cl.
CPC .............. *C02F 1/4674* (2013.01); *C02F 1/66* (2013.01); *C02F 2101/12* (2013.01)

(58) Field of Classification Search
CPC ........ C02F 1/66; C02F 2101/12; C02F 1/461; C02F 1/008; C02F 1/467; C02F 1/4672; C02F 1/4674; C02F 1/685; C02F 1/686; C02F 2209/02; C02F 2209/06; Y02W 90/20; B01F 15/00175; B01F 15/00207; B01F 15/0022; B01F 15/00253; B01F 15/00409; B01F 15/00412; C08F 14/06; C08F 114/06; C08F 214/06; C07C 21/04; C07C 21/06; G21F 9/32
USPC ............ 210/742, 743, 748.17, 754; 423/386, 423/419.1, 499.1, 499.4, 499.5, 645, 646; 366/151.1, 152.1, 152.2, 160.1, 162.1; 588/19
See application file for complete search history.

(56) References Cited

U.S. PATENT DOCUMENTS

| | | | | |
|---|---|---|---|---|
| 5,616,234 | A * | 4/1997 | Rhees | C02F 1/4674 205/500 |
| 5,770,035 | A * | 6/1998 | Faita | C25B 1/26 205/640 |
| 6,719,957 | B2 * | 4/2004 | Brady, Jr. | B01D 53/002 423/240 R |
| 8,153,838 | B2 * | 4/2012 | Bulan | C07C 263/20 560/347 |
| 8,329,951 | B2 | 12/2012 | Wloka et al. | |
| 9,150,490 | B2 * | 10/2015 | Ooms | C07C 68/02 |
| 2004/0152929 | A1 * | 8/2004 | Clarke | C07C 17/156 570/224 |
| 2007/0277551 | A1 * | 12/2007 | Kamper | C01B 7/0743 62/617 |
| 2010/0294727 | A1 * | 11/2010 | Gilbeau | C01D 3/14 210/748.13 |
| 2011/0091366 | A1 * | 4/2011 | Kendall | B01D 53/62 423/220 |
| 2014/0072653 | A1 * | 3/2014 | Buschmann | C07C 407/00 424/613 |
| 2017/0321330 | A1 * | 11/2017 | Malhotra | C25B 1/26 |

* cited by examiner

METHOD AND DEVICE FOR THE CONTINUOUS NEUTRALIZATION OF HYDROCHLORIC ACID

CROSS-REFERENCE TO RELATED APPLICATIONS

This application is a national stage application (under 35 U.S.C. § 371) of PCT/EP2018/051146, filed Jan. 18, 2018, which claims benefit of European Application No. 17152418.4, filed Jan. 20, 2017, both of which are incorporated herein by reference in their entirety.

The invention relates to a process and for the continuous neutralization of hydrochloric acid on an industrial scale and also to an apparatus for this purpose.

The invention proceeds from industrial processes which are known per se for the neutralization of hydrochloric acid which is formed as reaction by-product in the production of polymers or polymer precursors.

The chemical fundamentals of neutralization are comprehensively described in the literature. According to the Arrhenius concept (1887) and the expansion thereof by Bronsted-Lowry (1923), neutralization is the reaction between an acid and a base. Here, an acid is defined as a substance which in aqueous solution can dissociate and release protons with formation of hydronium ions or oxonium ions ($H_3O^+$). In contrast thereto, a base is a substance which on dissociation in aqueous solution forms hydroxide ions ($OH^-$) and can take up protons (cf MORTIMER, Charles E.; MÜLLER, Ulrich: *Chemie—Das Basiswissen der Chemie.*, $8^{th}$ edition, 2001, pages 234 and 282).

In the context described, the discontinuous method of titration to determine a graph for showing the pH is known for laboratory operation. Here, very small amounts of the base are added stepwise to a defined amount of an acid and the pH is determined by means of an indicator (cf. MORTIMER, Charles E.; MÜLLER, Ulrich: *Chemie—Das Basiswissen der Chemie.*, $8^{th}$ edition, 2001, p. 311 f.).

WO 2008083997 A1 has disclosed a continuous process for the neutralization of a hydrochloric acid-containing reaction mixture subsequent to the production of diphenylmethane diamine (MDA), in which the neutralization of the acid is carried out using ammonia and a separation of the reaction mixture into aqueous and organic phases is subsequently carried out. The separation of the ammonia from the aqueous phase by means of an oxide or hydroxide of an alkaline earth metal is possible in a further process step. As significant differences from the process of the present invention, it can be said that in the process of WO 2008083997 A1 the weak base ammonia (pH of 9.4) is added as neutralizing agent to an acidic reaction mixture after the MDA reaction is complete and a separation of the organic phase from the aqueous phase is carried out after the neutralization reaction, so that the two phases can be worked up separately or part of the amount of ammonia used can be recovered by reaction with milk of lime and subsequent distillation.

A further process engineering use of neutralization on an industrial scale takes place, for example, in the treatment of communal or process engineering waste water, which preferably occurs as acidic mixed waste water. Before introduction of the purified waste water into the main outfall, pH-neutral state (pH 7) is sought, and this is achieved by addition of strong acids and bases (usually sulfuric acid and sodium hydroxide or alternatively milk of lime) between computer and the preliminary water treatment. In addition, the addition of these substances serves to precipitate metal ions by formation of metal hydroxides. This procedure is referred to as neutralization precipitation and generally takes place in continuous treatment plants. Here, average residence times of 15 minutes at an average throughput of 10 $m^3/h$ are sought and mixing is carried out by means of slow-running mixing devices. However, the focus here is on the separation of metal hydroxides by sink processes, so that downstream precipitation processes are necessary (cf. HARTINGER, Ludwig: *Handbuch der Abwasser-und Recyclingtechnik.* $2^{nd}$ edition, 1991, p. 294 ff).

Principles of the process design and regulation technology may be found in the literature (cf. LIPTAK, Bela G.: *Instrument Engineers Handbook* $4^{th}$ edition, 2005, p. 2044 ft). However, nothing can be read here about the specific objective.

None of the known technical applications focuses on the neutralization of the strong acid hydrochloric acid with the strong base sodium hydroxide and the resulting process engineering and instrumentation challenges for setting the pH at large amounts of materials (in particular a volume flow of the hydrochloric acid of at least 1 $m^3/h$), in particular at variable hydrochloric acid input concentrations and a variable hydrochloric acid input stream and also, in particular, in the removal of the heat of reaction in a continuous and fully automated mode of operation.

The amount of hydrochloric acid obtained as coproduct in isocyanate production (MDI or TDI) can be processed further in an electrolysis or sent via transfer facilities to further use in the steel or rubber industry and the segment of water treatment. Owing to limited capacities for intermediate storage, overcapacities of acid formed can occur in the case of low uptake by the abovementioned hydrochloric acid sinks (low demand times for hydrochloric acid), which overcapacities cannot be processed further. Since it is not economically feasible in this context to reduce the production of isocyanate, the invention described is employed. The neutralization plant allows part of the amounts of hydrochloric acid obtained as coproduct in the production of isocyanate (MDI or TDI) to be processed when required without generating a reduction in isocyanate production.

It is an object of the present invention to provide a novel continuous neutralization process for hydrochloric acid of high concentration, which overcomes the above disadvantages and makes possible a reliable, economical, continuous process.

A specific object of the invention is to provide a continuous neutralization process which on an industrial scale can cope with the variable operational requirements in respect of input concentration and amount of hydrochloric acid in a continuously operating and fully automated neutralization process using sodium hydroxide while adhering to the target process parameters of pH and temperature. A particular object is regulation of the pH which develops as a logarithmic function of the concentration of hydronium ions in the aqueous solution. In addition, a further particular technical object is to automatically equalize process-related pressure fluctuations in the process steps preceding the neutralization and thus associated mass throughput fluctuations in a particular tolerance window.

The object is achieved by the neutralization of hydrochloric acid having a volume flow of at least 1 $m^3/h$ being carried out by means of alkali metal hydroxide in at least 3 reaction stages which comprise rough setting, fine setting and final setting of the pH and comprise recirculated substreams of the reaction mixture which are in each case cooled from stage to stage and take up the respective heat of reaction in these stages. To ensure the desired pH at the end, homogenization of the solution of the starting materials and the various reaction mixtures derived therefrom during the course of the process has to be ensured.

In particular, a concept of three reaction stages which allows the metered addition of the required neutralization amounts taking into account the maximum pH step in a reaction stage and the maximum usable concentration of the starting materials is employed in order to realize the target pH. These three stages make it possible to meet the requirements of the added amounts based on the required residual amount of neutralizing agent up to the target pH. Correspondingly, the metered addition capacity decreases with increasing number of reaction stages. The decreasing metered addition capacity is reflected in the choice of the metering valves.

The invention provides a process for the multistage, in particular three-stage, continuous neutralization of hydrochloric acid having an HCl concentration of at least 10% by weight and a volume flow of at least 1 m³/h, preferably at least 5 m³/h, to a target pH in the range from 3 to 9, which comprises the following steps:

A) introduction of the hydrochloric acid 4 to be neutralized and a proportion of at least 95%, preferably at least 99%, of the stoichiometrically required alkali metal hydroxide 5 in a first stage 1 into a volume flow 9 of neutralized hydrochloric acid which is recirculated cooled from a second stage 2, subsequent mixing of the streams 4, 5, 9 and reaction of the primary reaction mixture 18a in a neutralization and residence zone 17a), where the pH of the stream 6 flowing from the first stage 1 has a pH of at least 1 and the volume flow 9 of the hydrochloric acid recirculated cooled from the second stage 2 corresponds to at least three times the hydrochloric acid volume flow which is fed into the first stage 1, B) transfer of the volume flow 6 from the first stage 1 into a neutralization zone 17b of the second neutralization stage 2), further setting of the pH of the secondary reaction mixture 18b to a value of preferably 3 by means of addition of alkali metal hydroxide 5' or hydrochloric acid 4' at the introduction points 7" and 7'" in a secondary circuit 7', where this secondary circuit 7' results from a substream being taken off from the main stream 7 to be cooled of the second reaction stage 2 and the ratio of the volume flow 7 of the neutralized hydrochloric acid to the volume flow of the substream 7' is at least 10:1, and, after cooling 8 of the main stream of the second stage, recirculation of a further larger substream 9 of the secondary reaction mixture 18b from the second stage 2 to the first neutralization stage 1 for carrying out the reaction A), C) introduction of a further substream 10 of the secondary reaction mixture 18b of the second stage 2 into a neutralization zone 17c of a third neutralization stage 3), further setting of the pH value of the tertiary reaction mixture 18c in the third neutralization stage 3 to a pH in the range from pH 3 to pH 9 by means of addition of alkali metal hydroxide 5' or hydrochloric acid 4', in particular at the introduction points 11" and 11'" in a further secondary circuit 11') which is connected to the neutralization zone 17c, where this secondary circuit 11' consists of a smaller substream of the main stream 11 of the reaction mixture 17c exiting from the third stage, which is passed to cooling 12, and the larger substream 13 of the main stream 11 exiting from the third stage is, after cooling 12, passed to final quality control comprising temperature and pH monitoring and, if this cooled stream 13 of the tertiary reaction mixture 18c satisfies predetermined quality criteria, this stream 13 is taken off as product stream 15, or else the tertiary reaction mixture 18c is to be introduced as recycle stream 16 into the third stage 3 for further adjustment.

In a preferred embodiment of the novel process, sodium hydroxide is used as neutralizing agent (alkali metal hydroxide). Sodium hydroxide solution having a content of NaOCl of less than 100 ppm is preferably used as neutralizing agent. The concentration of the concentrated sodium hydroxide solution is preferably at least 15% by weight, particularly preferably at least 25% by weight, very particularly preferably at least 30% by weight.

The novel process is preferably carried out so that the average residence time of the reaction mixture 18a in the first neutralization stage 1 is from 20 s to 3 minutes.

The average residence time of the secondary reaction mixture 18b in the second neutralization stage 2 is, in a further preferred embodiment of the process, from 15 to 100 minutes.

The average residence time of the tertiary reaction mixture 18c in the third neutralization stage 3 is, in another preferred embodiment of the novel process, from 45 to 250 minutes.

A particularly preferred variant of the novel neutralization process is characterized by, independent of one another, the temperature of the primary reaction mixture 18a at the outlet from the first stage 1 being set to a value in the range from 45° C. to 80° C., preferably from 65° C. to 70° C., the temperature of the secondary reaction mixture 18h), which is measured directly in the second reaction stage 2, being set to a value in the range from 40° C. to 75° C., preferably from 60° C. to 65° C., and the temperature of the tertiary reaction mixture 18c at the outlet from the cooling of the third stage 12 being set to a value in the range from 15° C. to 55° C., preferably from 25° C. to 50° C. The target temperature of the tertiary reaction mixture 18c in the product stream 15 on leaving the plant is particularly preferably not more than 30° C.

In a preferred embodiment of the invention, a particular arrangement of static mixer and mixing nozzles is employed. In the first reaction stage, two inflow streams are combined in a static mixer in order to obtain a homogeneous reaction mixture in a comparatively short time.

A further particularly preferred embodiment of the novel neutralization process is therefore characterized in that the mixing of the streams 4, 5, 9 in the first neutralization stage 1 is carried out in a static mixer, with the static mixer having a mixing quality of at least 98%, preferably 99%.

For the present purposes, the quality feature mixing quality is the ratio of the volume having a homogeneous distribution of sodium hydroxide, hydrochloric acid and the reaction product thereof to the total volume. In this context, the objective of homogeneity means that every sample reflects a composition which corresponds to the totality. The mixing quality is established as a function of the volume flow and the resulting pressure drop at the mixing elements which generate transverse mixing owing to the turbulence in the mixing tube and is determined at a distance of 4× tube diameters downstream of each mixing element. Here, the distance downstream from the contact point of the fluids to be mixed to attainment of the mixing quality is referred to as mixing distance.

In a particular embodiment, the static mixer is followed by a downstream vessel which, owing to its volume, brings about a residence time 17a for complete reaction of the reaction mixture of the first stage 18a. The effect of homogenization of the reaction mixture is further intensified thereby. This is also necessary in order to be able to carry out a reliable pH measurement for the reaction mixture 18a.

In both further stages B) and C) ($2^{nd}$ and $3^{rd}$ reaction stage), mixing nozzles, in particular, are provided in order firstly to mix the inflowing streams and secondly bring about homogenization within the reaction vessels.

A preferred variant of the novel process is characterized in that a buffer volume in the region of about 25% of the usable vessel volume is provided in the neutralization zone 17b and/or in the neutralization zone 17c in order to compensate for fluctuations in the inflowing volume stream.

The novel neutralization process is particularly preferably configured so that mixing of the secondary reaction mixture 18b with the substream 4', 5', 7' and mixing of the tertiary reaction mixture 18c with the substream 4', 5', 11' are provided independently of one another using stirring tools 19 in the neutralization zone 17b or 17c or by means of mixing nozzles 20 which are provided in the entry region of the feed conduits for the substream 7' or it to the neutralization zone 17b or 7c.

In all stages, the metering valves for the metered addition of sodium hydroxide are, in particular, duplicated in order to be able to carry out a very precise metered addition. Accordingly, there is a rough metering device and a small valve for fine adjustment for each neutralization stage. For the addition of hydrochloric acid, this duplication of the metering devices is not absolutely necessary when a prescribed value is set, particularly in the first stage, and only an overswing in the is countered in the other stages and there is no specific regulation task in these stages.

Furthermore, it is, in a preferred embodiment of the process, helpful to ensure a particular residence time for the reaction of sodium hydroxide and hydrochloric acid. Appropriate residence times are for this purpose provided in the reaction stages. Since the static mixer which is preferably to be used in the first stage generates virtually no residence times, a residence vessel is installed downstream of the static mixer. This makes it possible for the reaction mixture to be reacted completely and increases the informativeness of the pH measurement after the first stage. The same technical necessity requires appropriate residence times in the second and third stages, but these have, in contrast to the first stage, been realized, in particular, by means of integrated reaction vessel volumes. This has the additional advantage of a buffer capacity of the system in the case of deviations in the process magnitudes of the inflow streams and thus prevents the direct shutdown of the plant when these process windows are departed from. The volumes of the second and third reaction vessel have, in a preferred embodiment, been selected so that resonant oscillation of the pH regulating devices is avoid (resonance catastrophe).

The overall plant for carrying out the novel process is, in particular, configured as a continuous flow plant and is designed for continuous operation without the necessity of interrupting the flow because of reaction or reequipping times. Thus, continual processing of hydrochloric acid can be ensured and load restrictions or load fluctuations in upstream processes do not have to be feared.

The heat evolved in the neutralization reaction is, in particular, removed stepwise by means of cooling water coolers via separate cooling circuits in the second and third reaction stages. In the second stage, a substream is also recirculated for cooling purposes to upstream of the first stage. Circulation pumps are typically used for transporting the reaction mixture to the heat exchangers, and these additionally lead to a mixing effect within the apparatus (by rotation of the rotor) and also as a result of recirculation to the vessels. By means of these measures it is ensured, in particular, that materials engineering limits are adhered to and the neutralized waste water produced falls within the respective specified requirements and can therefore be utilized for further processes.

In a preferred embodiment of the novel process, alkali metal hydroxide, in particular sodium hydroxide having a content of NaOCl of less than 100 ppm is used so that there is no formation of free chlorine during the reaction, which would in turn require the use of a reducing agent.

If necessary, the alkali metal hydroxide used, preferably sodium hydroxide, is admixed before use with a reducing agent, preferably sodium bisulfate, in order to set the above-mentioned maximum content of NaOCl. As an alternative, the reducing agent can also be added to the stream of alkali metal hydroxide, in particular sodium hydroxide, in the second neutralization stage of the process.

The invention will be illustrated below with the aid of the figures and the examples, which, however, do not represent any restriction of the invention.

The figures show:

FIG. 1 a schematic view of a three-stage neutralization of hydrochloric acid

Figure 2:
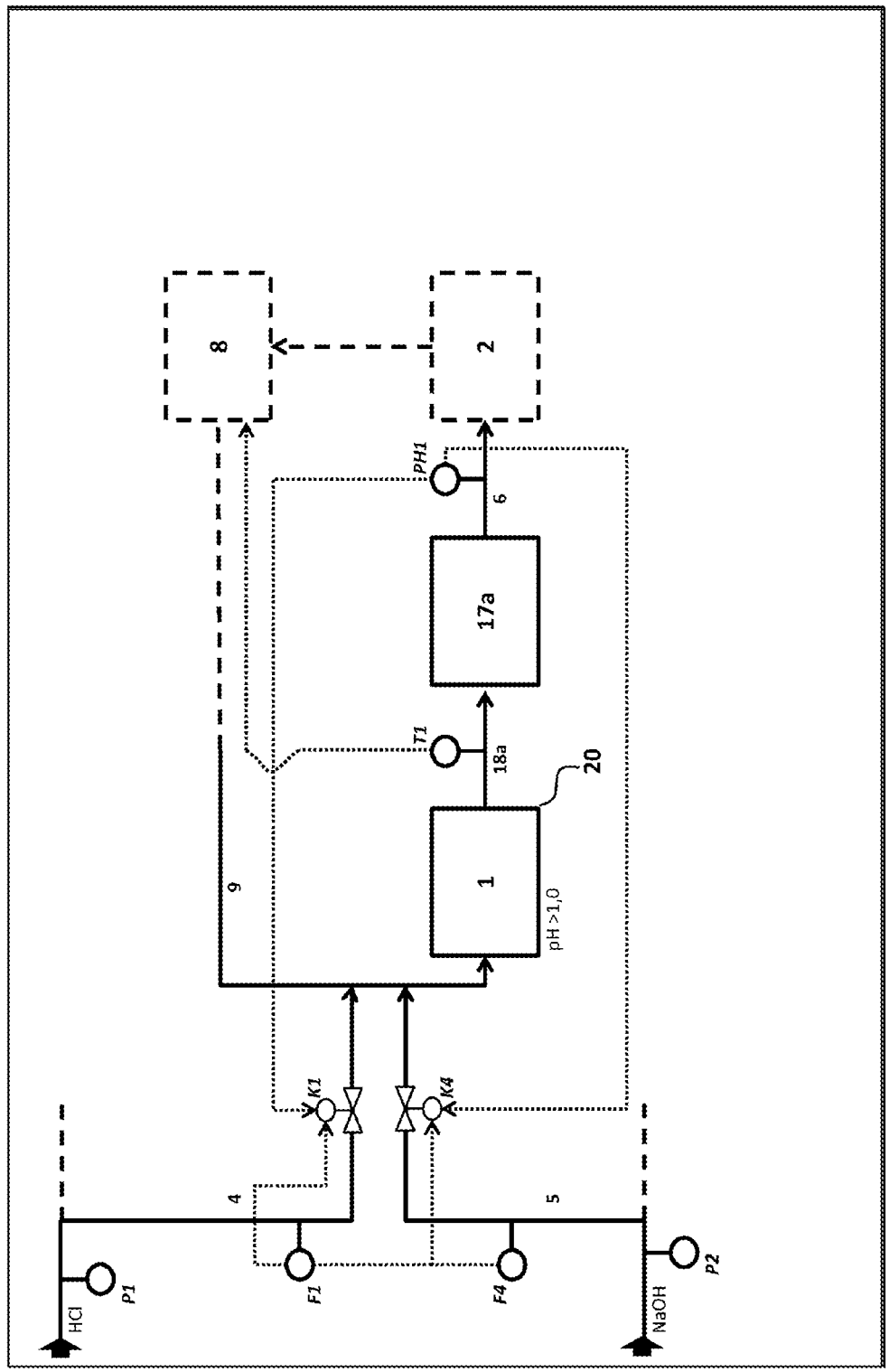

FIG. 2 a schematic view of details of the first neutralization stage

Figure 3:
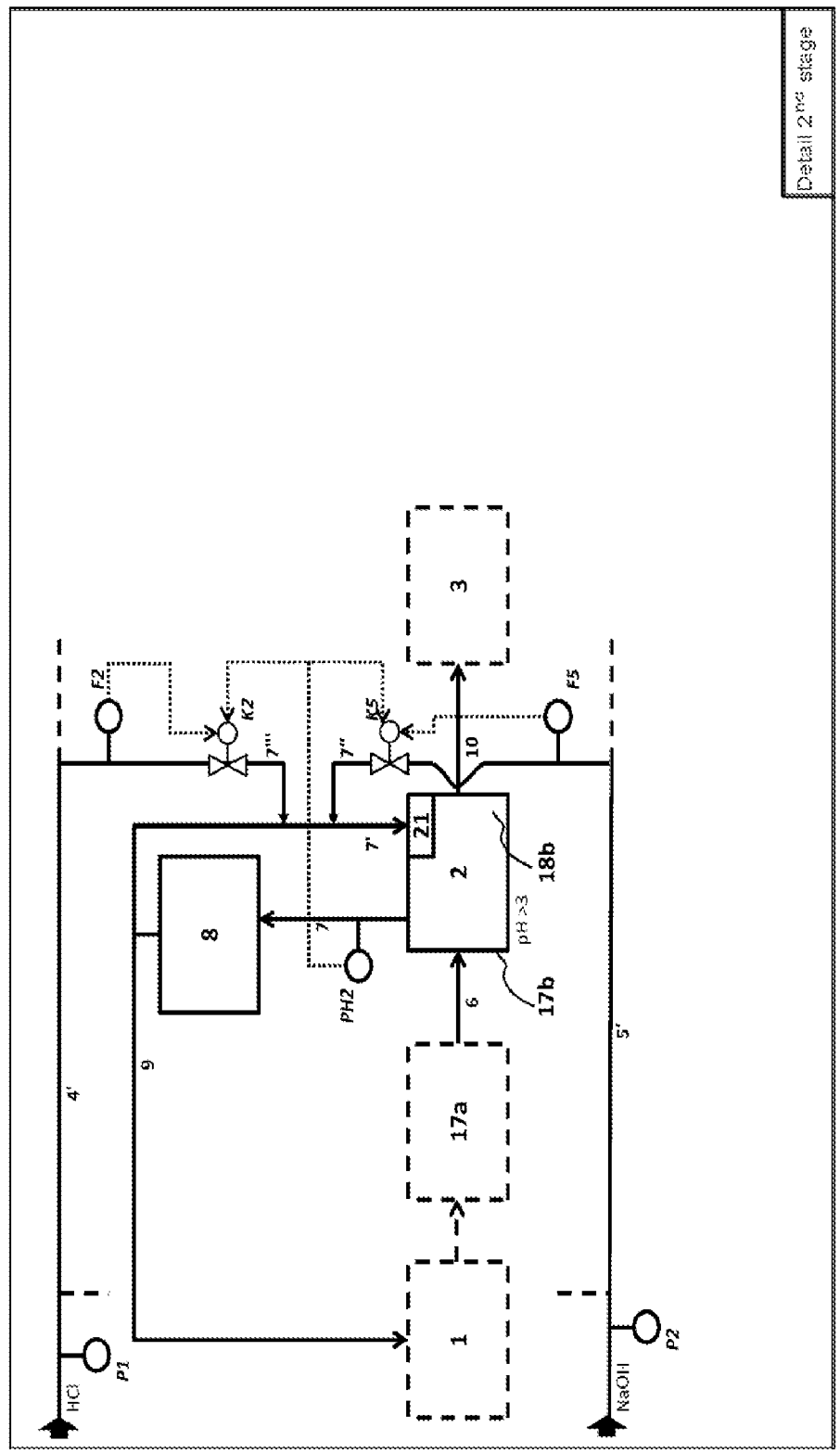

FIG. 3 a schematic view of details of the second neutralization stage

Figure 4:
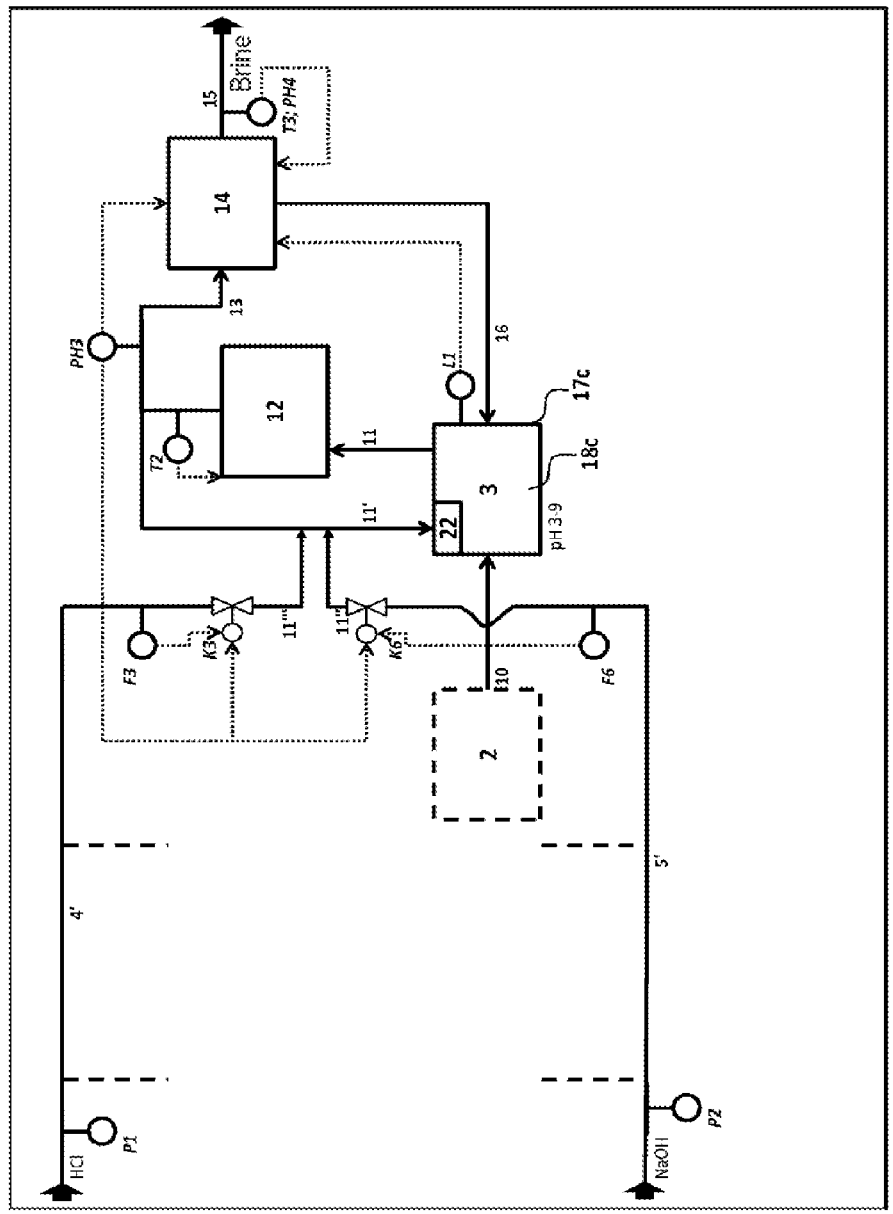

FIG. 4 a schematic view of details of the third neutralization stage

In the figures, the reference symbols have the following meanings:

1 first neutralization stage
2 second neutralization stage
3 third neutralization stage
4 hydrochloric acid to be neutralized
4' hydrochloric acid stream for setting of the target pH in $2^{nd}$ and $3^{rd}$ stage
5 sodium hydroxide
5' sodium hydroxide stream for setting of the target pH in $2^{nd}$ and $3^{rd}$ stage
6 reaction mixture exiting from the first stage
7 main stream from the second neutralization stage
7' smaller secondary circuit of partially neutralized hydrochloric acid from main stream 7
7'' metered addition of sodium hydroxide into secondary circuit of the second neutralization stage
7''' metered addition of hydrochloric acid into secondary circuit of the second neutralization stage
8 cooling of the first and second neutralization stages
9 recirculation of cooled reaction mixture of the second stage
10 reaction mixture exiting from the second stage
11 reaction mixture exiting from the third stage
11' smaller secondary circuit of neutralized hydrochloric acid of stream 11
11'' metered addition of sodium hydroxide into secondary circuit of the third neutralization stage
11''' metered addition of hydrochloric acid into secondary circuit of the third neutralization stage
12 cooling of the third neutralization stage
13 cooled reaction mixture of the third stage
14 monitoring of the release criteria or quality of the product stream
15 discharged product stream from the neutralization in the quality window
16 recirculated reaction mixture outside the quality window
17a residence and neutralization zone after the first stage
17b neutralization zone of the second stage
17c neutralization zone of the third stage 18a (primary) reaction mixture of the first stage
18b (secondary) reaction mixture of the second stage
18c (tertiary) reaction mixture of the third stage
20 static mixer of the first stage
21 mixing nozzles of the second stage
22 mixing nozzles of the third stage
F1 flow measurement for hydrochloric acid inflow into first neutralization stage
F2 flow measurement for hydrochloric acid inflow into second neutralization stage
F3 flow measurement for hydrochloric acid inflow into third neutralization stage
F4 flow measurement of sodium hydroxide inflow into first neutralization stage
F5 flow measurement of sodium hydroxide inflow into second neutralization stage
F6 flow measurement of sodium hydroxide inflow into third neutralization stage
K1 regulating device for hydrochloric acid inflow into first neutralization stage
K2 regulating device for hydrochloric acid inflow into second neutralization stage
K3 regulating device for hydrochloric acid inflow into third neutralization stage
K4 regulating valve pair for sodium hydroxide inflow into first neutralization stage
K5 regulating valve pair for sodium hydroxide inflow into second neutralization stage
K6 regulating valve pair for sodium hydroxide inflow into third neutralization stage
P1 inlet pressure measurement for hydrochloric acid
P2 inlet pressure measurement for sodium hydroxide
PH1 pH measurement after first neutralization stage for pH regulation
PH2 pH measurement after second neutralization stage for pH regulation
PH3 pH measurement after third neutralization stage for pH regulation
PH4 monitoring of target pH
T1 temperature measurement after first neutralization stage for coaling water regulation
T2 temperature measurement after third neutralization stage for cooling water regulation
T3 monitoring of target temperature

EXAMPLES

Example 1

After starting up the cooling and pumping circuits and also activating the starting material supply, the neutralization plant is ready for operation. An operating pressure of 6.3 bar/0.63 MPa prevails at the measurement position P2 for the 32% strength sodium hydroxide used and an operating pressure of 5.4 bar/0.54 MPa prevails at the measurement position P1 for the 31% strength hydrochloric acid to be neutralized. An intended value for the hydrochloric acid stream to be neutralized is entered into the process control system by the operating employee. A hydrochloric acid inflow stream 4 having a volume flow of 30.0 m³/h is introduced into the recycle stream of cooled reaction mixture from the second stage 9. Via a ratio regulator F1 and F2 and via the pH regulation of the first stage PH1, an amount of 28.5 m³/h of the stream from 9 and 4 is metered into the first neutralization stage K4 via the regulating valve pair of the sodium hydroxide feed. Each total volume stream of 179 m³/h subsequently went into a static mixer 20 which represents the mixing device of the first neutralization stage 1. After passage through intensive homogenization, the temperature T1 for regulating the cooling water flow for cooling of the first and second stage 8 is measured downstream of the static mixer. A temperature of 65.4° C. is established at this position. The primary reaction mixture 18a subsequently goes into a residence and neutralization zone 17a which is realized by means of a vessel through which flow occurs and is provided for further reaction of each reaction mixture in order subsequently to guarantee a reliable pH measurement PH1 for regulating the amount of sodium hydroxide 5 introduced. A pH of 1.6 is established in the reaction mixture exiting from the first stage 6.

In the next step, the still acidic salt brine goes into the second stage of the neutralization plant 2 which is operated at ambient pressure. The residence time thereof is ensured by means of an atmospheric-pressure reaction vessel located in a high position (not shown) by a till level of 58.3%, corresponding to about 30 m³, being established via a free overflow in normal operation. By means of installation of the mixing nozzles 21, the resulting turbulence in the reaction stage 2 is utilized for mixing. In addition, the mixing nozzles 21 draw in art about four-fold stream of each reaction mixture 18b from the surrounding vessel volume. Two small mixing nozzles are oriented tangentially to the bottom and a large jet mixer acts centrally and obliquely upward and thus ensures thorough mixing in the volume. This mixing principle is employed analogously in the third neutralization stage 3. From this stage, a main stream 7 of the reaction mixture 18b is taken off and passed to cooling 8. Here, a large part of the heat of neutralization of the first and second stages is transferred to the cooling water. In the process, the cooling water of the cooling facility 8 heats up from 14.7° C. to 24.5° C. The main part of the brine outlet which has been precooled in this way is conveyed in the form of the recycle stream 9 in an amount of 120 m³/h to upstream of the first stage of the neutralization 1. A smaller substream 7' of this brine operates the mixing nozzles 21 in a secondary circuit. After setting the pH regulation PH2, 120.0 l/h of alkali are metered at the introduction position 7" into this stream and 0.7 l/h of acid are metered in at the introduction position 7'. The back-coupling of the metering device K5 is again effected by means of a flow meter F5. During transport of the secondary stream 7' through the mixing nozzles 21, homogenization of the reaction mixture 18b in the neutralization zone 17h takes place and a pH of 9.2, which is measured by means of the pH measurement PH2 in the outflow stream 7 from this neutralization stage 2 to the cooling 8, is established.

The reaction mixture 18b goes in the form of the stream 10 from the second stage 2 via an overflow into the third stage of the neutralization 3, which owing to the 3-fold volume capacity realizes a significantly higher residence time. This volume ratio of the volume of the second stage to the volume of the third stage is designed to avoid resonant oscillation in the regulation circuits and thus avoid an associated resonance catastrophe. From this third stage, a main stream 11 of the reaction mixture 18c is likewise taken off and passed to cooling 12. In this process step, the heat of neutralization of the third stage is transferred to the cooling water. In the process, the cooling water of the cooling facility 12 heats up from 14.7° C. to 29° C. In return, the reaction mixture 18c cools down from 36.5° C. to 29° C. A cooling water volume stream of 466 m³/h is required for cooling in the first, second and third stages (8 and 12). After cooling, the secondary circuit 11' operates the mixing nozzles 22 of the third neutralization stage 3. After setting the pH regulation PH3, 28.0 l/h of alkali were metered into this for stream at the introduction position 11" and 34.0 l/h of acid were metered in at the introduction position 11'''. When the secondary stream 11' is conveyed through the mixing nozzles 22, homogenization of the reaction mixture 18c in the neutralization zone 17c occurs and a of 8.6, which is measured in the stream 13 by means of the pH measurement PH3, is established. To secure the measurement of the output pH from the third stage and for availability requirements which the instrumentation has to meet, this pH measurement is configured in triplicate (redundant). As a function of the fill level in the third reaction stage 3, the reaction mixture 18c is discharged via a fill level regulator LI with adherence to the release criteria pH (measurement PH3 and PH4) and temperature (measurement T3) in process step 14. 58.7 m$^3$/h are discharged at a constant fill level of 60.8%. When the limit values for the parameters of the resulting brine are exceeded in stream 13, the output is interrupted and the volume stream 13 is conveyed in the form of the stream 16 back to the third neutralization stage 3. Thus, in the first step, brine can be buffered for a short time in the second and third reaction stage (2 and 3). For this purpose, each of the two stages is operated about ¾ full in normal operation. In the second step, if further adjustment of the circuit operation of the third stage is not successful, the inflowing stream of acid and thus alkali into the first stage is gradually decreased (see concept of load reduction).

Details of the Design of the Metering Devices:

The alkali for the first stage 1 is metered from the network via two parallel valves K4 which have a gradated valve size (kvs value). The fine valve is regulated directly and has a maximum throughput which is a factor of 10 lower than the coarser valve. The latter is regulated more slowly from the manipulated variable of the small valve so that no resonance occurs between the valves. When the smaller valve reaches its maximum opening during running-up of production over a ramp, the coarser valve is open slightly. As a result, the smaller valve can close somewhat again. The larger valve is actuated sufficiently frequently for the required target pH to be attained. Likewise, the coarser valve closes stepwise when the fine valve threatens to close. Rapid and also precise regulation of the alkali stream can be achieved in this way. In the transition region to the first opening of the coarser valve, a hysteresis is run through because the valves no longer meter linearly in the boundary region. Thus, the small valve runs in this region through the total setting range, while at higher volume flows it should remain at from 20 to 80% manipulated variable.

This basic principle described here for the example of the first stage is also implemented in the second stage 2 at the sodium hydroxide introduction K5 and in the third stage 3 at the sodium hydroxide introduction K6. The second stage and the third stage attempt primarily to regulate the prescribed pH values. While the bandwidth for the third stage is determined by the output limits, the first and second stages can be prescribed as a function of the power of the regulating means. Since the expected metered streams of sodium hydroxide in the third stage are very small, metering is effected via a valve and in parallel via a displacement pump.

Due to the high accuracy requirements which the metering has to meet because of the desired pH values of the stages, overswing is possible. Although acidic solution again flows out from the preceding stages after correction of the regulation, an additional introduction of acid at the two stages 2 and 3 was realized because of the sometimes long residence times. The simple regulating valve is again guided by the following flow meter.

Details of the Design of the Regulating Concept:

The comprehensive process concept described here is based on a regulating concept, which is characterized by measurement of many process parameters such as incoming volume flows, entry pressures and also temperature, fill level and pH per reaction stage and also monitoring of the cooling water temperature, and allows firstly fully automated operation of the plant by means of intelligent process control and secondly a particular variation of the process parameters of the inflowing media (concentration, pressure and amount) to which the overall system automatically adjusts. Direct intervention by the operator after start-up of the plant is not necessary in normal operation. Thus, a regulating circuit for the pH, via which the amounts of required neutralizing agent are determined and set at the metering valves is employed in each stage. Accordingly, a constant pH is aimed at in each stage and with increasing number of reaction stages approaches the target pH.

The integrated concept for load regulation makes it possible to run the neutralization plant with efficient utilization and considerably simplifies operation of the plant by personnel. The load regulation carries out an automatic reduction of the load in order to keep critical process parameters below their limit values. In this way, the capacity of the neutralization plant can be matched optimally and economically to the required neutralization capacity. The neutralization plant is operated automatically at maximum load while adhering to the prescribed limit values for the process parameters of the product solution and optimal utilization of the plant capacity at maximum throughput. In this load regulation taking into account the regulation of load-dependent process parameters, the setting of a constant intended load value for the HCl stream (4) to be neutralized by the plant operator is combined with an automatic load change effected by that in the process control system if process parameters approach their upper limit value. This concept is suitable for applications in which the load has an inverse effect on the process parameters, i.e. an increase/decrease in the load leads to a rise/reduction in the process parameters. In normal operation, i.e. when the process parameters taken into account (T1, PH1, PH2, T2, PH3, T3, PH4 and also further quality parameters (turbidity and conductivity)) are below their limit value, the load prescribed by the plant operator is run. The fact that the critical process parameters are in the subcritical region tells the plant operator that the set value of the load can be increased by intervention of the plant operator. When the respective process parameter approaches its upper limit value, an automatic load change is carried out by the process control system in order to keep the deviating process parameter within its threshold value. The automatic load change is carried out by means of regulating circuits (e.g. PID, MPC) provided for the respective process parameter. For this purpose, in each case superposed master regulating circuits are provided for the prescribed load and the process parameters, which have the task of regulating the respective process parameter to its set value using the load as manipulated variable. The manipulated variables of the superposed master regulating circuits are in each case intended values for the subordinate regulating circuit (slave) which intervenes in the process via an actuator (e.g. valve K1) so that, at the prevailing pressure conditions and the given valve properties, the flow required by the slave regulator is established.

A further instrumentational optimization of the process is provided by the automatic cooling water regulation. The process temperatures in the first, second and third neutralization stages are measured and when the set values are exceeded the cooling water stream is automatically increased by means of actuators in the form of regulating valves. Here, for the temperature measurement of the first neutralization stage (T1), there is a regulating circuit for cooling water amount of the cooling facility of the first and second stage (8). Furthermore, the temperature measurement of the third neutralization stage (T2) acts by means of direct regulation on a regulating valve of the cooling facility of the third stage (12). As a result, the system reacts to load changes or temperature fluctuations and avoids direct intervention of the automatic load reduction when a process parameter is exceeded (see previous paragraph).

The pH regulations of the individual stages are implemented according to the recommendation of the literature in the form of a "feed-forward" regulation (cf. LIPTAK, Bela G.: *Instrument Engineers Handbook*, $4^{th}$ edition, 2005, p. 2044 ff). Thus, not only the local volume and the local pH are utilized, but the respective inflowing solution of the previous stage is also taken into account. For the first stage, the introduced volume streams flow in together. In addition, the supply pressures, which have been recognized as main malfunction parameters, have also been taken into account. For the second stage, the required amount of alkali is from the recirculation stream plus the streams metered into the first stage and the pH. For the third stream, this calculation is carried out from the previously introduced volume streams and the pH at the outlet from the second stage, which thus represents the content of the reaction mixture 18c.

The neutralization plant is configured according to the safety requirements for the chemicals used. Here, compatible materials of construction are employed and appropriate safety concepts are provided for severe deviation of process parameters. In addition, the plant is a closed plant in which acidic waste air streams which occur are sent in a targeted manner into an existing exhaust air treatment plant.

The invention claimed is:

1. A process for the multistage continuous neutralization of hydrochloric acid having an HCl concentration of at least 10% by weight and a volume flow of at least 1 m³/h, to a target pH in the range from 3 to 9, which comprises the following steps:
   A) introducing the hydrochloric acid to be neutralized and a proportion of 95%, of a stoichiometrically required amount of alkali metal hydroxide in a first stage into a volume flow of neutralized hydrochloric acid, wherein the volume flow of neutralized hydrochloric acid is recirculated and cooled from a second stage, subsequent mixing of the neutralized hydrochloric acid, the alkali metal hydroxide and the volume flow to form a primary reaction mixture and reaction of the primary reaction mixture in a neutralization and residence zone, where the pH of a stream flowing from the first stage has a pH of greater than 1 and the volume flow of the hydrochloric acid recirculated and cooled from the second stage corresponds to at least three times the hydrochloric acid introduced to be neutralized in the first stage,
   B) transferring the stream flowing from the first stage into a neutralization zone of the second stage, further setting of the pH of a secondary reaction mixture formed in the second stage to a value of greater than pH 3, cooling a second volume flow exiting the second stage (7) forming a cooled second volume flow and recirculating the cooled second volume flow by a secondary substream (7') of a secondary circuit to the neutralization zone of the second stage and by a primary substream to the first stage and, wherein said further setting of the pH is set by addition of alkali metal hydroxide or hydrochloric acid to the recirculated cooled volume flow of the secondary substream, where the ratio of the second volume flow exiting the second stage (7) to the volume flow of the secondary substream is at least 10:1, and
   C) introducing a further substream of the secondary reaction mixture of the second stage (10) into a neutralization zone of a third stage forming a tertiary reaction mixture, further setting of the pH value of the tertiary reaction mixture in the third stage to a pH in the range from pH 3 to pH 9 by means of addition of alkali metal hydroxide or hydrochloric acid to join a recirculated cooled volume flow of the third substream, cooling a third volume flow exiting the third stage (11) forming a cooled third volume flow, and recirculating the cooled third volume flow by a third substream (11') of a third circuit to the neutralization zone of the third stage and by a further substream (13) to a final quality control unit (14) comprising a temperature and pH monitoring stage, and is taken off as a product stream (15) if the cooled third volume flow satisfies a quality criteria in the monitoring stage, or otherwise is taken off as a recirculated stream (16) to the third stage.

2. The process as claimed in claim 1, wherein the alkali metal hydroxide is sodium hydroxide.

3. The process as claimed in claim 1, wherein an average residence time of the primary reaction mixture in the first stage is from 20 seconds to 3 minutes.

4. The process as claimed in claim 1, wherein an average residence time of the secondary reaction mixture in the second stage is from 15 to 100 minutes.

5. The process as claimed in claim 1, wherein an average residence time of the tertiary reaction mixture in the third stage is from 45 to 250 minutes.

6. The process as claimed in claim 1, wherein, independent of one another, the temperature of the primary reaction mixture exiting from the first stage is set to a value in the range from 45° C. to 80° C., the temperature of the secondary reaction mixture is set to a value in the range from 40° C. to 75° C., and the temperature of the tertiary reaction mixture exiting from the third stage is set to a value in the range from 15° C. to 55° C.

7. The process as claimed in claim 1, wherein the primary reaction mixture is formed in a static mixer, where the static mixer has a mixing quality of at least 98%.

8. The process as claimed in claim 1, wherein a buffer volume in the range of +/−20% is provided in the neutralization zone of the second stage and in the neutralization zone of the third stage.

* * * * *